United States Patent
Yurich et al.

(10) Patent No.: US 7,648,442 B2
(45) Date of Patent: Jan. 19, 2010

(54) METHOD OF CREATING RIGID CARDS WITH AN EXERCISE ROUTINE

(75) Inventors: Gary Yurich, Royal Oak, MI (US); James Smith, Clarkston, MI (US); Christopher Ulewicz, Sterling Heights, MI (US); Chad Yurich, Parshall, CO (US)

(73) Assignee: My Training Card LLC, Troy, MI (US)

( * ) Notice: Subject to any disclaimer, the term of this patent is extended or adjusted under 35 U.S.C. 154(b) by 673 days.

(21) Appl. No.: 11/277,837

(22) Filed: Mar. 29, 2006

(65) Prior Publication Data

US 2006/0223038 A1 Oct. 5, 2006

Related U.S. Application Data

(60) Provisional application No. 60/666,369, filed on Mar. 30, 2005.

(51) Int. Cl.
*A63B 15/02* (2006.01)
(52) U.S. Cl. .................. 482/1; 482/9; 482/900; 434/257
(58) Field of Classification Search .......... 482/1–9, 482/51, 52, 900–902; 434/247, 257
See application file for complete search history.

(56) References Cited

U.S. PATENT DOCUMENTS

| | | | |
|---|---|---|---|
| 4,831,242 A | 5/1989 | Englehardt et al. | |
| 4,907,795 A * | 3/1990 | Shaw et al. | 482/9 |
| 4,934,694 A * | 6/1990 | McIntosh | 482/9 |
| 5,391,128 A | 2/1995 | deBear | |
| 5,410,472 A | 4/1995 | Anderson | |
| 5,706,822 A | 1/1998 | Khavari | |
| 5,759,043 A | 6/1998 | Craig | |
| 5,890,997 A | 4/1999 | Roth | |
| 5,916,063 A | 6/1999 | Alessandri | |
| 6,358,188 B1 | 3/2002 | Ben-Yehuda et al. | |
| 6,626,800 B1 | 9/2003 | Casler | |

(Continued)

OTHER PUBLICATIONS

PC-Kits QuickStartTutorial, Nov. 2000, pp. 1-28.*

(Continued)

*Primary Examiner*—Glenn Richman
(74) *Attorney, Agent, or Firm*—Howard & Howard Attorneys PLLC

(57) ABSTRACT

A method of creating rigid cards (32) having an exercise routine (58) thereon for use by a user (26). The rigid cards (32) are prepared utilizing a computer (34) in communication with a database (40). A plurality of exercises (54) are determined and the exercises (54) are input into the computer (34) to define the exercise routine (58) specific to the user (26). A unique identifier (60) specific to the user (26) is input into the computer (34) and linked to the exercise routine (58). The unique identifier (60) and the exercise routine (58) are stored in the database (40) and printed on the rigid card (32). The method further includes modifying the exercise routine (58) and inputting the modified exercise routine into the computer (34) to define an alternative exercise routine (144). The alternative exercise routine (144) is linked to the unique identifier (60) and stored in the database (40). The unique identifier (60) and the alternative exercise routine (144) are printed on a second rigid card (116).

30 Claims, 14 Drawing Sheets

U.S. PATENT DOCUMENTS

| | | | |
|---|---|---|---|
| 6,626,805 | B1 | 9/2003 | Lightbody |
| 6,659,946 | B1 | 12/2003 | Batchelor et al. |
| 6,746,370 | B1 | 6/2004 | Fleming et al. |
| 7,041,032 | B1* | 5/2006 | Calvano .................. 482/4 |
| 2002/0055419 | A1 | 5/2002 | Hinnebusch |
| 2002/0082143 | A1* | 6/2002 | Leeds ..................... 482/1 |
| 2003/0211916 | A1 | 11/2003 | Capuano |
| 2004/0198555 | A1 | 10/2004 | Anderson et al. |
| 2004/0229729 | A1 | 11/2004 | Albert et al. |
| 2005/0010426 | A1 | 1/2005 | Chen et al. |
| 2005/0015281 | A1 | 1/2005 | Clark et al. |
| 2007/0020597 | A1* | 1/2007 | Jones .................. 434/247 |

OTHER PUBLICATIONS

Exercise cards as easy as 1-2-3, pp. 1 *Visual Health Information* (internet article) http://www.vhikits.com/products/cards/Cards.aspx, dated Jan. 19, 2006.

Individualized exercise programs available for Physical Rehabilitation patients Aug. 2005, pp. 2 *St. Anthony's Memorial Hospital*, Dec. 22, 2005 (internet article) http://www.stanthonyshospital.org/Current_ Events/archived/2005archives/ptExercise.htm, dated Jan. 19, 2006.

Solotrainer's Pocket-Size Workout Cards, pp. 5 *SoloTrainer, Inc., Old Bethpage, NY Solotrainer.com* (internet advertisement article) http://www.solotrainer.com/id20_m.htm, dated Jan. 19, 2006.

VHI PC Kits: Desktop Edition, pp. 3 VHI (internet advertisement article) http://www.exrx.net/Store/VHI/PCKits.html dated Jan. 19, 2006.

PCT Search Report; dated Sep. 13, 2007; 9pages.

* cited by examiner

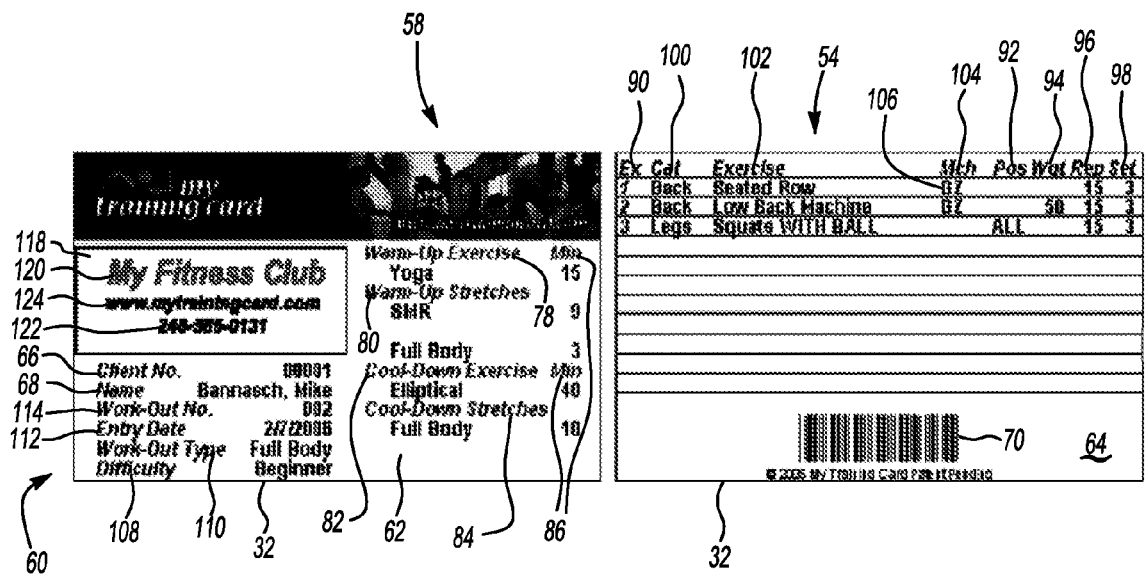
*Fig-3A*   *Fig-3B*
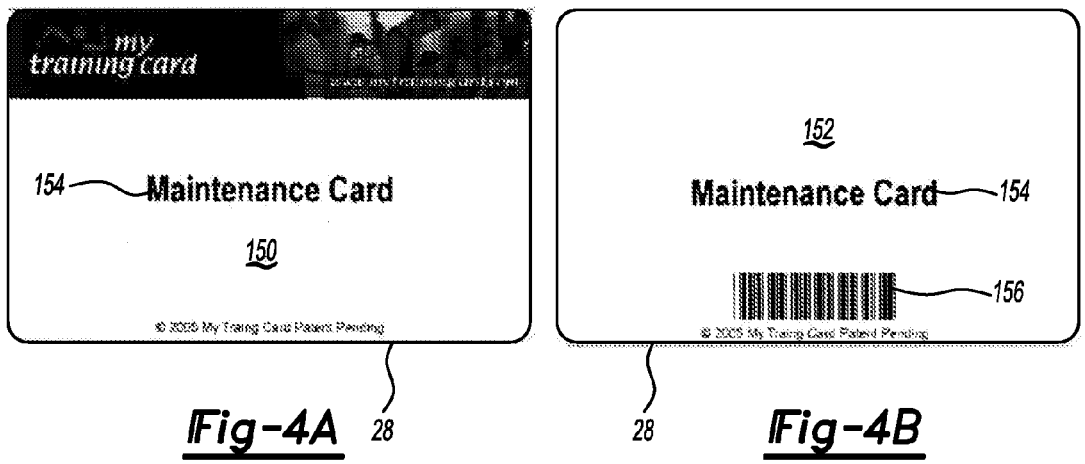
*Fig-4A*   *Fig-4B*
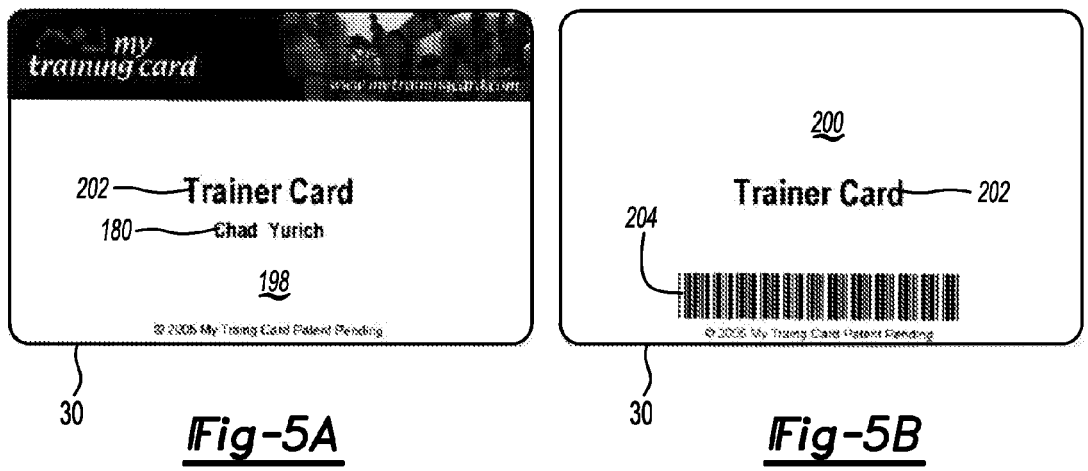
*Fig-5A*   *Fig-5B*

METHOD OF CREATING RIGID CARDS WITH AN EXERCISE ROUTINE

CROSS REFERENCE TO RELATED APPLICATION

This application claims the benefit of U.S. provisional patent application Ser. No. 60/666,369, which was filed on Mar. 30, 2005.

BACKGROUND OF THE INVENTION

1. Field of the Invention

The present invention relates to a method of creating rigid cards for use by a user. The rigid cards have an exercise routine, such as a workout routine or a rehabilitation routine, printed thereon from a database.

2. Description of the Prior Art

Typically, a user can go to a store or to a website to buy preprinted cards having an exercise routine printed thereon for the user to use at an exercise facility. Each preprinted card provides the user with a different exercise routine to perform. However, these preprinted cards are not tailored to the specific needs of each user, which means that the preprinted cards do not take into account the health conditions of each user. Therefore, the user is at risk of being injured when performing the exercise routine on the preprinted cards.

To alleviate the injury risk, exercise facilities employ trainers to work with the users. The trainer shows the user how to exercise properly and creates the exercise routine specific to needs of the user. The trainer records the exercise routine on paper sheets or charts. The user carries the paper sheets around the exercise facility to record the exercises while moving from one exercise to the next. The problem with paper is it can be awkward to carry around, writing gets blurred by sweat, paper gets ruined by sweat, hard to organize information, not able to track member's activities efficiently, and people do not like to use paper.

To avoid the paper problem and the injury risk, exercise facilities provide their users with a single card to access the facility and/or to use on an exercise machine. A method of creating the single card is disclosed in U.S. Pat. No. 6,659,946 (the '946 patent) to Batchelor et al. The method of the '946 patent includes providing the user with a trainer to determine a plurality of exercises for the user to perform. The trainer inputs the exercises into a computer to define the exercise routine specific to the user. The trainer also inputs a unique identifier into the computer and links the unique identifier to the exercise routine. The unique identifier and the exercise routine are stored in a database and stored in an electronic memory within the card. When the user wants to perform the exercise routine, the card must electronically communicate with a card reader at each exercise machine to provide the user with the information required to perform the exercise. Therefore, the user is dependent on the single card and the computer to provide all of the essential information about the exercise routine. Plus, all of the exercise machines must be upgraded with the proper equipment to run the system, which is time consuming and expensive.

Therefore, there remains a need to develop a method of creating rigid cards having an exercise routine printed thereon from a computer in communication with a database for a use by a user.

SUMMARY OF THE INVENTION AND ADVANTAGES

The present invention provides a method of creating rigid cards for use by a user having an exercise routine thereon. The rigid cards are prepared utilizing a computer in communication with a database. The method includes determining a plurality of exercises specific to the user and inputting the exercises into the computer to define the exercise routine specific to the user. At least one unique identifier specific to the user is input into the computer and linked to the exercise routine. The unique identifier and the exercise routine are stored in the database and the unique identifier and the exercise routine are printed on the rigid card. The method further includes modifying the exercise routine specific to the user and inputting the modified exercise routine into the computer to define an alternative exercise routine. The alternative exercise routine is linked to the unique identifier and stored in the database. The unique identifier and the alternative exercise routine are printed on a second rigid card.

The present invention therefore provides a method of creating rigid cards for use by a user having an exercise routine printed thereon from a computer in communication with a database. The method provides the user with a choice between performing the exercise routine printed on the rigid card and performing the alternative exercise routine printed on the second rigid card. The method caters to the specific needs of each user, avoids the drawbacks of using paper, and avoids the expenses of investing in upgraded exercise machines.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3A is a front view of a rigid card for a user;

FIG. 3B is a back view of the rigid card;

FIG. 4A is a front view of a maintenance card;

FIG. 4B is a back view of the maintenance card;

FIG. 5A is a front view of a trainer card;

FIG. 5B is a back view of the trainer card;

FIG. 9 is an exertion phase for the exercise facility system;

FIG. 10 is a plurality of user information for the exercise facility system accessed from the rigid card;

DETAILED DESCRIPTION OF THE INVENTION

Figure 1:
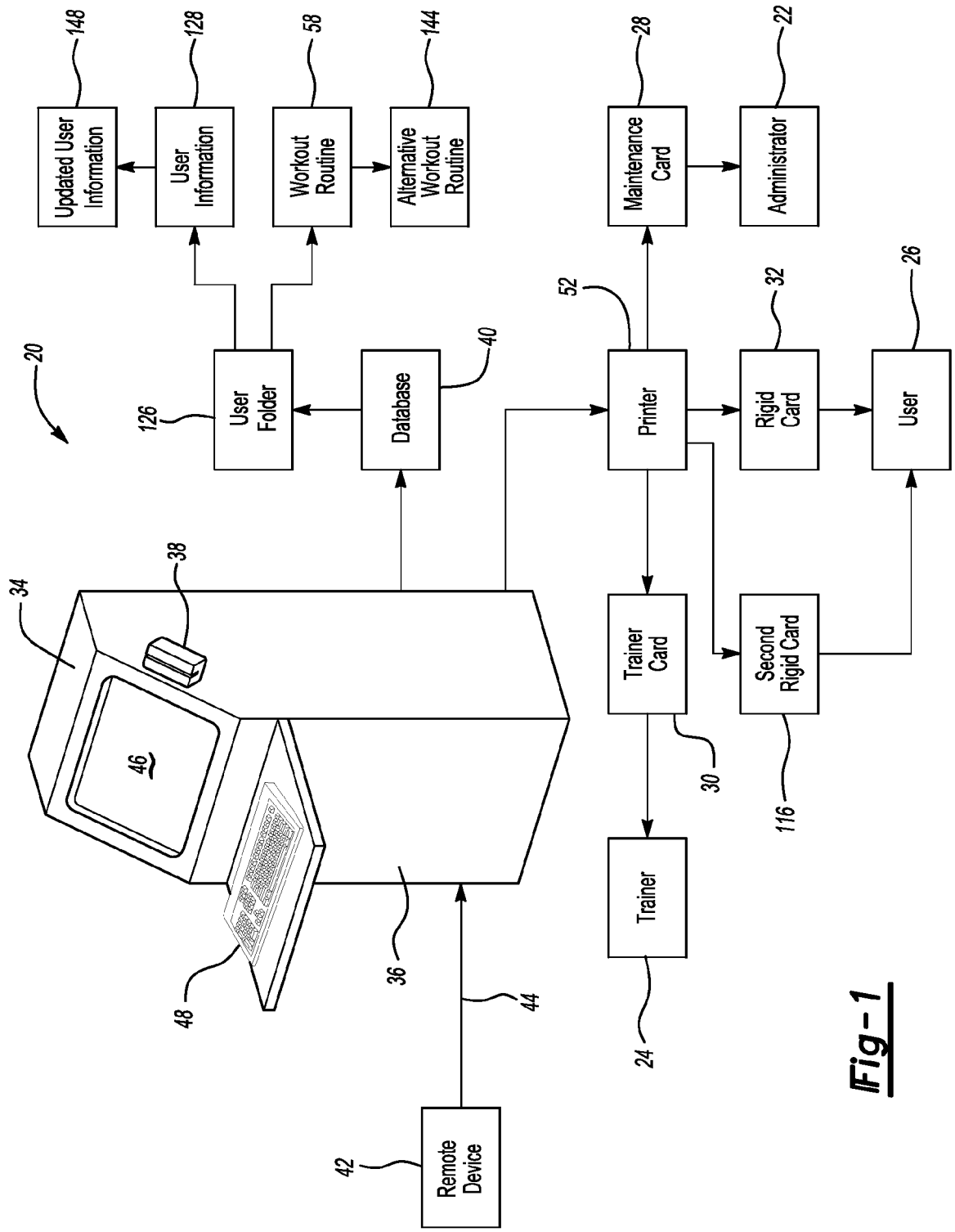
FIG. 1 is an illustration of an exercise facility system.

Referring to the Figures, wherein like numerals indicate corresponding parts throughout the several views, an exercise facility system 20 is generally shown in FIG. 1. It is to be appreciated that FIGS. 2-28 display the trademark "My Training Card™" which is owned by the inventor of this application. The use of this phrase in the Figures is by no means intended to make this term generic.

The exercise facility system 20 is particularly suited for use at an exercise facility. Illustrative examples of exercise facilities include a gym, a doctor's office, a hospital, a rehabilitation facility, a home, and any facility where an exercise routine, which is generally shown at 58, may be performed. The exercise routine 58 comprises any routine that utilities the user's muscles, such as a workout routine having a plurality of exercises, which is generally shown at 54, a rehabilitation routine having a plurality of rehabilitation exercises, a yoga routine having a plurality of yoga positions, or any combination thereof. The exercise facility system 20 may include any authorized person to assist a plurality of users 26 at the exercise facility. For example, authorized persons may include trainers 24 and administrators 22, such as doctors, nurses, or specialists. The administrator 22 has a maintenance card 28, the trainer 24 has a trainer card 30, and the user 26 has a rigid card 32 to access the exercise facility system 20. A retractable reel (not shown), a lanyard (not shown), or a clip (not shown) may be used to fasten the maintenance card 28, the trainer card 30, and the rigid card 32 to the administrator 22, the trainer 24 and the user 26, respectively, for easy accessibility of the cards 28, 30, 32.

The exercise facility system 20 may include a user terminal 36 in communication with a database 40. The user terminal 36 may be a computer 34 and preferably is a stand-alone kiosk 38. The exercise facility system 20 may be accessed over a remote device 42, such as the internet. For example, over the internet, the administrator 22, the trainer 24 and the user 26 would be presented with an interface similar to the user terminal 36 and would be in communication with the remote device 42 through a network connection 44, thereby eliminating the need to physically be at the exercise facility. It is to be appreciated that if the administrator 22, the trainer 24, or the user 26 creates and/or modifies the rigid card 32, the user 26 must go to the exercise facility to pick up the rigid card 32 or the rigid card 32 may be mailed to the user 26. As another example, the exercise facility system 20 allows the user 26 to create the rigid card 32 over the internet and will generate the rigid card 32 at the exercise facility, such that the user 26 may retrieve the rigid card 32 upon the next visit. Alternatively, the exercise facility system 20 may delay generating the rigid card 32 until the next time the user 26 visits the exercise facility and identifies them to the exercise facility system 20 or requests the rigid card 32.

The exercise facility system 20 may be accessed by using at least one unique identifier, generally shown at 60, specific to the user 26. The unique identifier 60 is assigned to the user 26 to identify the user 26 in the database 40 and input into the computer 34. The unique identifier 60 is further defined as at least one of an access code, a password, a magnetic strip, a bar code, a user number 66, a user name 68, and a machine readable code 70 capable of identifying the user 26 to the system 20, such as a smart card. For example, the access code and/or the password may be used to gain access to the database 40 of the exercise facility system 20 over the internet or through the user terminal 36 at the exercise facility if the user 26 lost his/her rigid card 32 and wants to reprint the rigid card 32.

Figure 2:
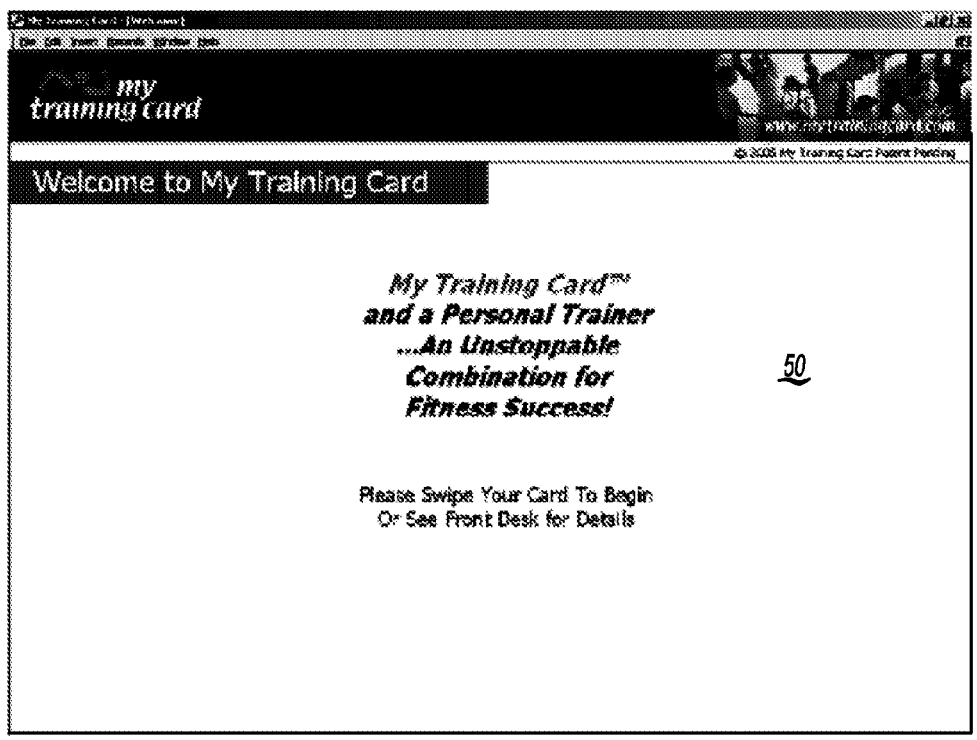
FIG. 2 is an introduction page for the exercise facility system.

The exercise facility system 20 and the computer 34 are in communication with each other. The computer 34 may have a touch screen 46 and a keyboard 48 for providing a way to input information and maneuver through the database 40. However, other conventional methods of inputting information may be used, such as a mouse. As shown in FIG. 2, the touch screen 46 displays an introduction page 50 to prompt the user 26, the trainer 24, and the administrator 22 to use the user terminal 36.

Referring back to FIG. 1, a printer 52 is coupled to the computer 34 for printing the rigid cards 32, the maintenance card 28, and the trainer card 30. The printer 52 can print on a rigid stock material, as compared to paper. In addition, the printer 52 can print on both sides of the rigid stock material. Preferably, the rigid cards 32, the maintenance cards 28, and the trainer cards 30 are five inches in height and seven inches in length. Even more preferably, the rigid cards 32, the maintenance cards 28, and the trainer cards 30 are three inches in height and five inches in length. As shown in FIGS. 3A, 3B, 4A, 4B, 5A, and 5B, in the most preferred embodiment, the rigid cards 32, the maintenance cards 28, and the trainer cards 30 are credit card size. In addition, the rigid cards 32, the maintenance cards 28, and the trainer cards 30 are preferably formed of a rigid material. Even more preferably, the rigid cards 32, the maintenance cards 28, and the trainer cards 30 are formed of a plastic material. However, it is to be appreciated that the rigid cards 32, the maintenance cards 28, and the trainer cards 30 may be made out of any suitable material that has rigid characteristics.

Figure 6:
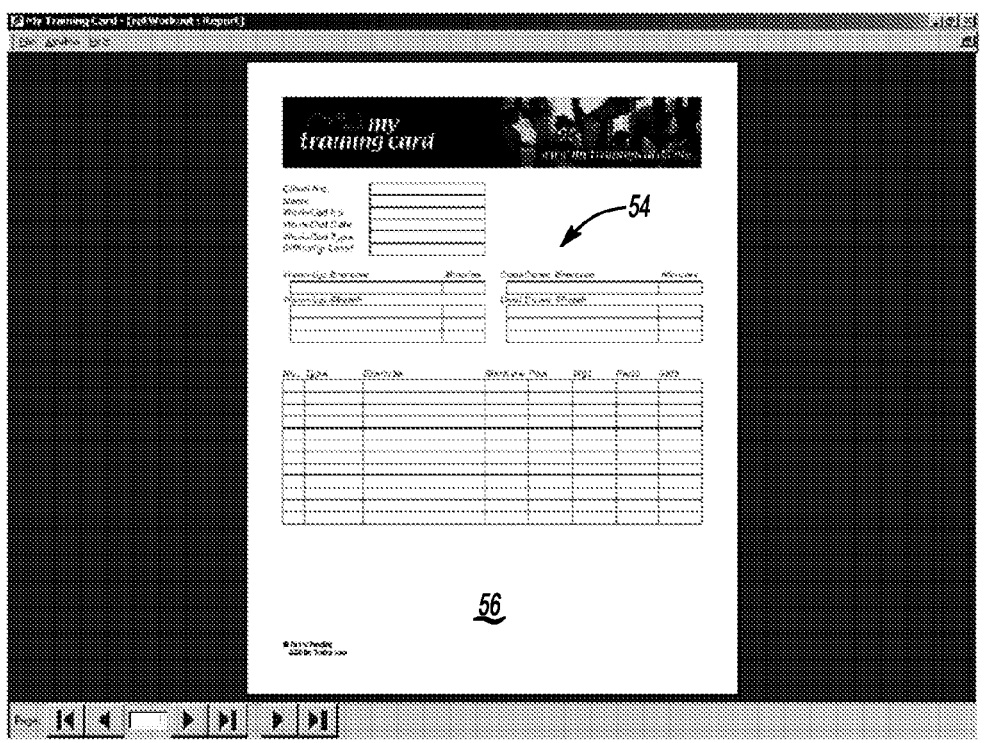
FIG. 6 is an illustration of a computer terminal showing a screen-shot of a workout form sheet for hand writing an exercise routine thereon.

The trainer 24 instructs the user 26 on how to exercise properly at the exercise facility. Referring to FIG. 6, the trainer 24 determines the exercises 54 for the user 26 to perform and records the exercises 54 on a workout form sheet 56. The workout form sheet 56 provides a way for the exercises 54 to be hand written on the sheet 56 and later received in the database 40 and printed on the rigid card 32. However, it is to be appreciated that the administrator 22 and/or the user 26 may determine the exercises 54. Also referring to FIGS. 3A and 3B, the trainer 24 uses his trainer card 30 to access the computer 34 for inputting the exercises 54 from the workout form sheet 56 to define the exercise routine 58 specific to the user 26. The exercise routine 58 is linked to the unique identifier 60 to associate the exercise routine 58 to the user 26. The printer 52 prints the unique identifier 60 and the exercise routine 58 on the rigid card 32 having a front side 62 and a back side 64. Preferably, the user number 66 and the user name 68 are printed on the front side 62 of the rigid card 32 and the machine readable code 70 is printed on the back side 64 of the rigid card 32.

Figure 7:
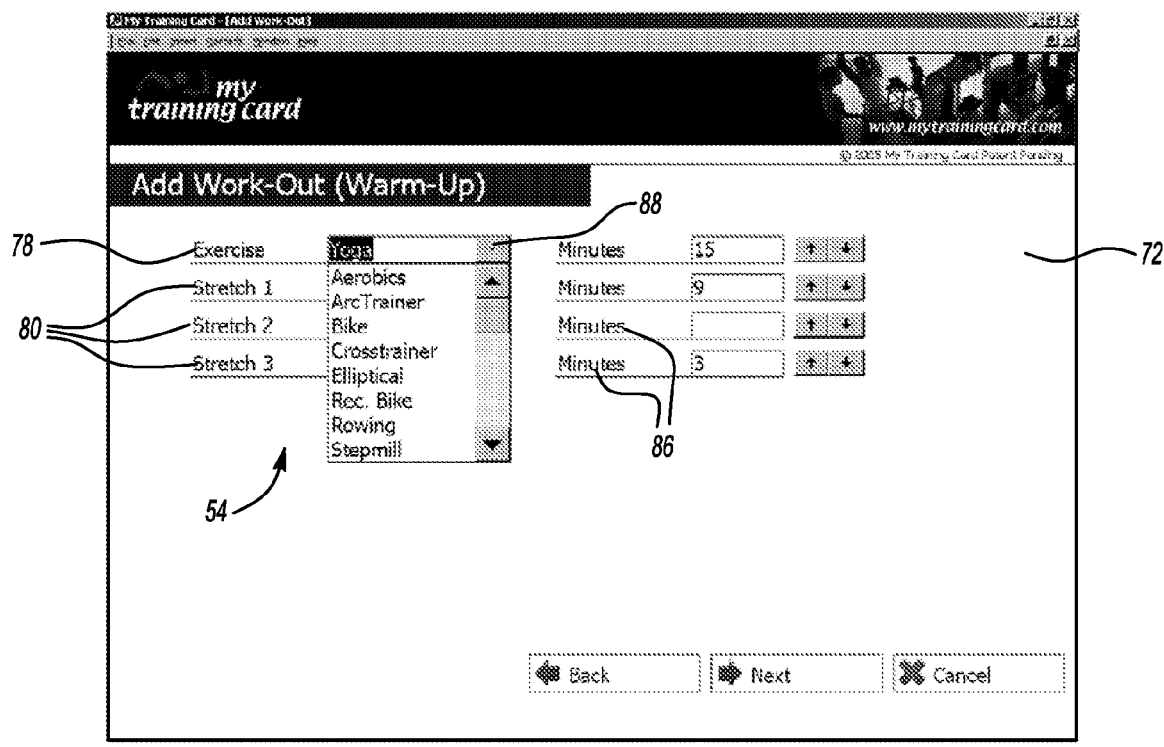
FIG. 7 is a warm-up phase for the exercise facility system.
Figure 8:
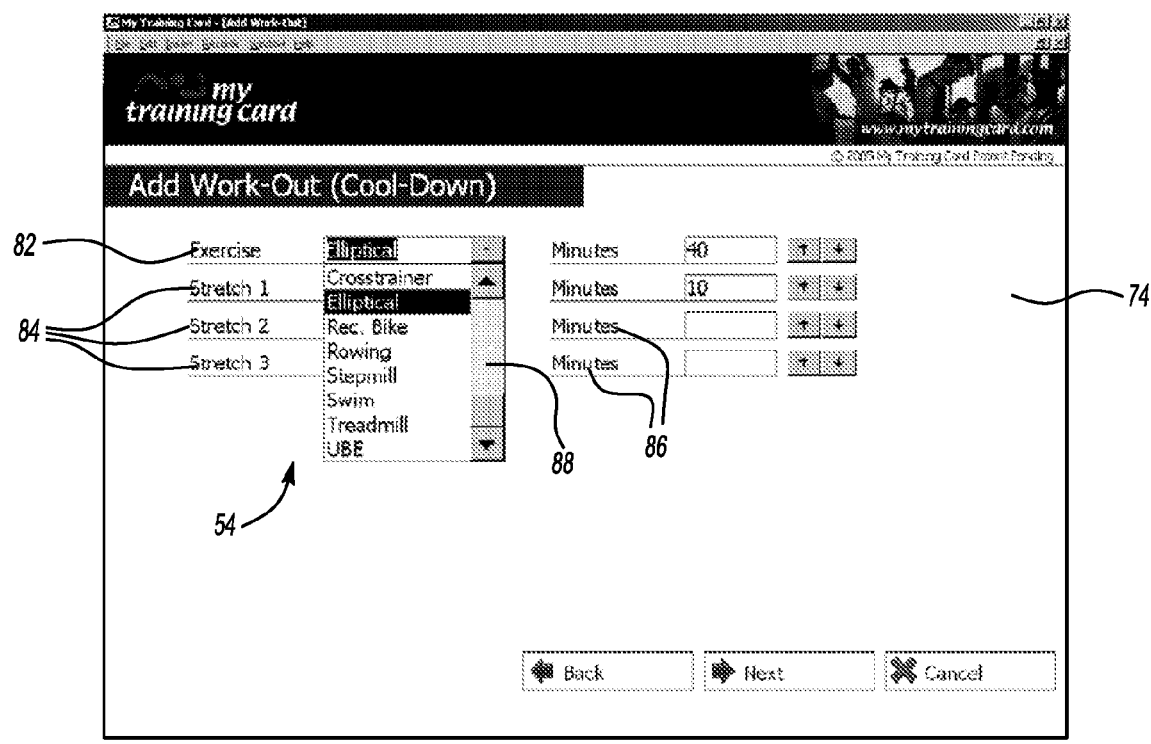
FIG. 8 is a cool-down phase for the exercise facility system.
Figures 9, 10:
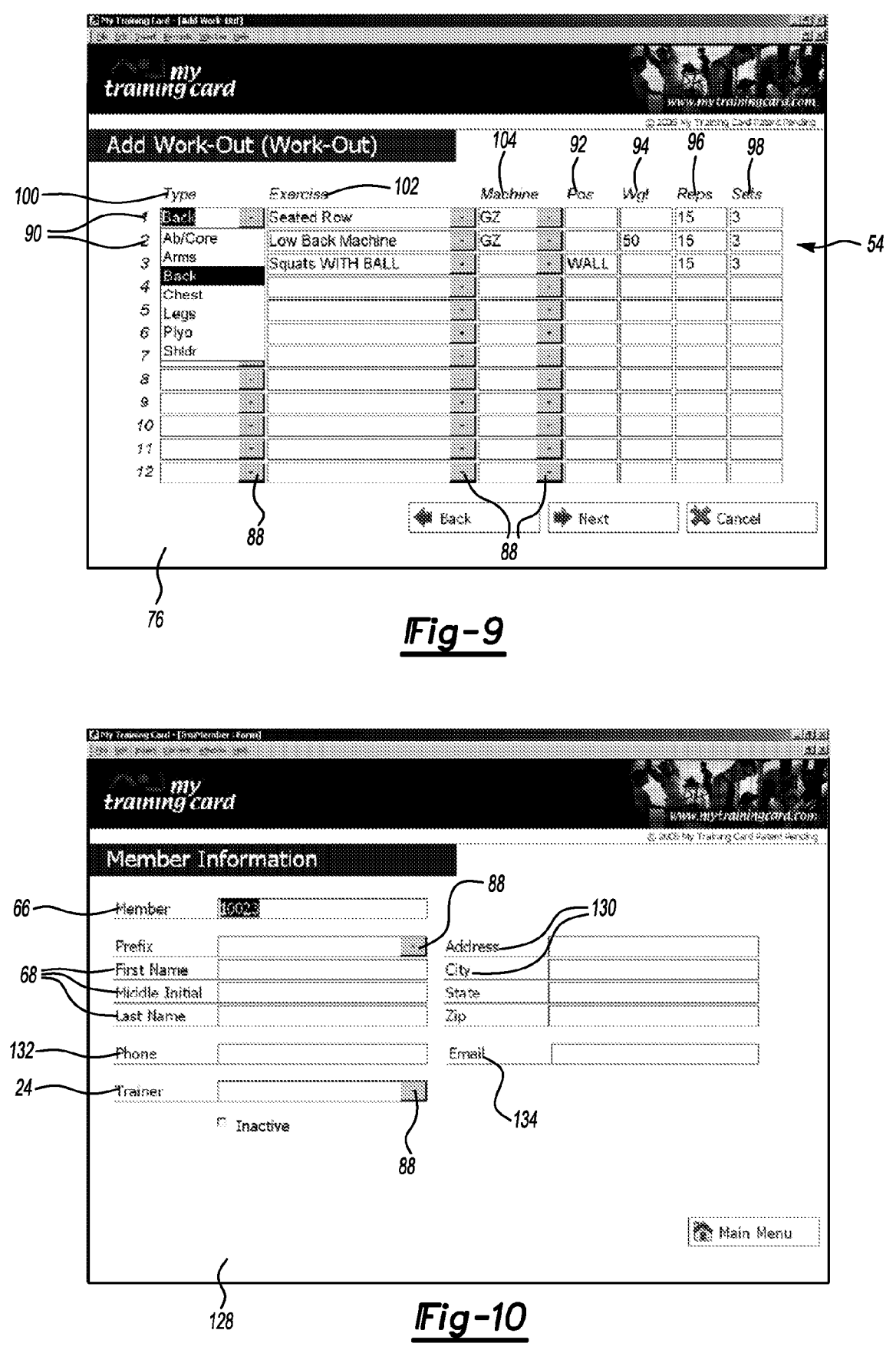

As best shown in FIGS. 7, 8, and 9, the exercises 54 are further defined as a warm-up phase 72, a cool-down phase 74, and an exertion phase 76. Preferably, the warm-up phase 72 and the cool-down phase 74 are printed on the front side 62 of the rigid card 32 and the exertion phase 76 is printed on the back side 64 of the rigid card 32 (as shown in FIGS. 3A and 3B). However, it is to be appreciated that the warm-up phase 72, the cool-down phase 74, and the exertion phase 76 may be printed anywhere on the rigid card 32.

The warm-up phase 72 includes as at least one of a warm-up exercise 78 and a warm-up stretch 80. The warm-up exercises 78 may include yoga, aerobics, ArcTrainer, bicycling, cross-trainer, elliptical, upper body exerciser (UBE), rowing, step-mill, swimming, and treadmill. The warm-up stretches 80 may include shoulders, arms, back, chest, self myofacial release (SMR), hamstrings, abductors, and legs. The cool-down phase 74 includes as at least one of a cool-down exercise 82 and a cool-down stretch 84. The cool-down exercises 82 may include yoga, aerobics, ArcTrainer, bicycling, cross-trainer, elliptical, UBE, rowing, step-mill, swimming and treadmill. The cool-down stretches 84 may include shoulders, arms, back, chest, SMR, hamstrings, abductors, and legs.

The warm-up phase 72 and cool-down phase 74 each provide a time limit option 86 to establish the duration to perform each of the warm-up exercise 78, the cool-down exercise 82, the warm-up stretch 80, and the cool-down stretch 84. One of ordinary skill in the art will appreciate that the warm-up exercises 78, the warm-up stretches 80, the cool-down exercises 82, and the cool-down stretches 84 is merely an example of a variety of exercises and stretches that may be perform and any other exercise and stretch known in the art may be used. A drop-down menu 88 may be utilized to select the warm-up exercises 78, the warm-up stretches 80, the cool-down exercises 82, and the cool-down stretches 84. However, it is to be appreciated that the drop-down menu 88 may be utilized for any other exercise 54 or information of the system 20.

The exertion phase 76 is further defined as an exercise number 90, a position 92, an amount of weight to lift 94, a number of repetitions 96, a number of sets 98, a targeted muscle group 100, a type of exercise 102, and an exercise machine 104. The exercise number 90 provides an order to perform each of the exercises 54. The position 92 may provide the setting for the particular exercise machine, such as seat position, chest position, feet position, back position, or the like. The position 92 may further provide a location for the exercises 54; for example, a push up could have the position 92 of a wall or a floor, meaning that the push up is performed on the wall or the push up is performed on the floor. The amount of weight to lift 94 provides the amount of resistance to use to perform each of the exercises 54. The number of repetitions 96 and the number of sets 98 provides the user 26 with the duration to use to perform each of the exercises 54.

The targeted muscle group 100 includes abdominals/core, arms, back, chest, legs, plyo, and shoulders. The type of exercise 102 may include an internal rotations dumbbell, an external rotations dumbbell, a front raise, a lateral raise, a shoulder retraction, an arm wall slide, a wall push up, a scaption, a seated row, a low back machine, a squats with ball, a single leg deadlift, a single leg one arm row, a lunge in place dumbbells, a stand arm row cable, a stiff legged deadlift, a T-bar row, an upright cable row, an upright row, an abdominal machine, a back extension, a reverse fly, a chest fly, a hanging knee raise, a low row, a bicep curl, a lat pull down, a push ups, a tricep pushdowns on ball, a front raise, a bicycle crunch. However, one of ordinary skill in the art will appreciate that the targeted muscle group 100 and the type of exercises 102 are merely an example of a variety of muscle groups to exercise and a variety of exercises to work those muscle groups and should not be construed as all inclusive.

Figure 26:
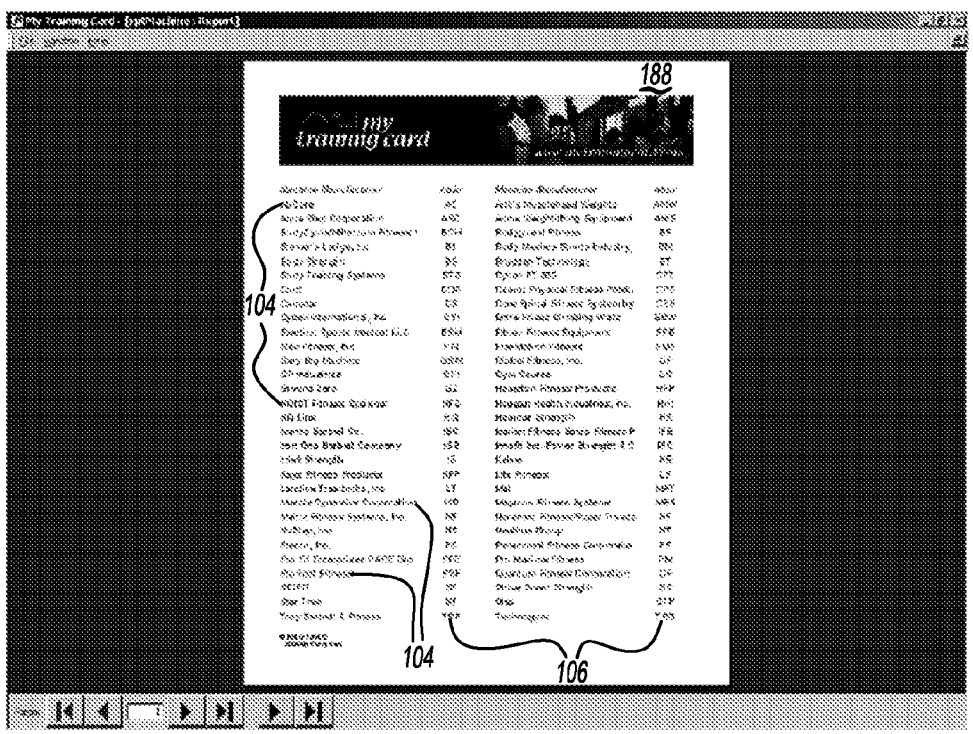
FIG. 26 is an illustration of the computer terminal showing a screen-shot of a printable machine list option for the exercise facility system.

As best shown in FIGS. 3B and 26, the exercise machines 104 are defined as a plurality of abbreviations 106 printed on the rigid card 32. The abbreviations 106 must be printed on the rigid cards 32 because there is limited space on the cards 32 to provide information to the user 26. The abbreviations 106 correspond to the respective exercise machine 104. An abbreviation key (not shown) may be disposed throughout the exercise facility to provide the user 26 with a visual guide of the corresponding exercise machine 104. An example of a possible abbreviation key is illustrated in FIG. 26. The exercise machines 104 may include an AbCore machine, an Aqua Step machine, an Arik's Musclehead Weights machine, an Acme Weightlifting Equipment machine, a BodyCycle/Millenium Fitness I machine, a Brewer's Ledge machine, a Body Strength machine, a Bodyguard Fitness machine, a Body Masters Sports Industry machine, a Brudden Technology machine, a Body Training System machine, a Cybex FT 360 machine, a Cord machine, a Cemco Physical Fitness Product machine, a Camstar machine, a Core Spinal Fitness System machine, a Cybex International machine, an Entre Prises Climbing Walls machine, an Exertion Sports Medical machine, a Finex Fitness Equipment machine, a Flex Fitness machine, a Freemotion Fitness machine, a Global Fitness machine, a GP Industries machine, a Gym Source machine, a Ground Zero machine, a Hampton Fitness Products machine, a HOIST Fitness Systems machine, a Hoggan Health Industries machine, a HQ Line machine, a Hammer Strength machine, an Ivanko Barbell machine, an Icarian Fitness Equip Fitness machine, an Iron Grip Barbell machine, an Innofit Inc.-Power Strength & Company machine, an Intek Strength machine, a Kelser machine, a Keys Fitness Products machine, a Life Fitness machine, a Landice Treadmills machine, a Mat machine, a Muscle Dynamics machine, a Magnum Fitness Systems machine, a Matrix Fitness System machine, a Noramco Fitness/Super Treads machine, a NuStep machine, a Nautilus Group machine, a Paramount Fitness machine, a Precor machine, a Pro Fit Enterprises PACE Group machine, a Pro Maxima Fitness machine, Pro Spot Fitness machine, a Quantum Fitness machine, a SCIFIT machine, a Strive Smart Strength machine, a Star Trac machine, a Step machine, a Troy Barbell & Fitness machine, and a Technogym machine. It is contemplated that any other exercise machine 104 known in the art may be used.

Referring back to FIGS. 3A and 12, the rigid card 32 further includes a difficulty level 108, a type of workout 110, a calendar date 112, and a workout number 114 printed on the front side 62 of the rigid card 32. The difficulty level 108 includes a rehabilitation level, a beginner level, an intermediate level, an advanced level, and an extreme level for providing the ability level of the user 26. The type of workout 110 includes a full body workout, a lower body workout, an upper body workout and a circuit workout for providing which parts of the body are performing the exercises 54. Moreover, any part of the body that may be exercised, such as through rehabilitation, may be inserted for the type of workout 110 independent of whether the type of workout 110 had previously been entered into the system 20. In other word, additional, more specific types of workouts 110 may be entered. The calendar date 112 provides information on when the exercise routine 58 was created. The workout number 114 identifies the card as the rigid card 32, a second rigid card 116, a third rigid card (not shown), and so on. The rigid card 32 further includes a company information location 118 printed on the front side 62 of the rigid card 32. The company information location 118 provides a company name 120, a company phone number 122, and a company website 124 of the exercise facility.

Referring back to FIG. 1, when the rigid card 32 is swiped through the kiosk 38, the kiosk 38 reads the machine readable code 70 disposed thereon to allow the user 26 access to a user folder 126 stored in the database 40. The user 26 can only access the user folder 126 specific to himself/herself. The user folder 126 includes a plurality of user information 128 and the exercise routine 58 specific to the user 26. Also referring to FIG. 10, the user information 128 includes a user address 130, a user telephone number 132, a user email address 134, the user name 68, the user number 66, and the trainer 24.

Figure 11:
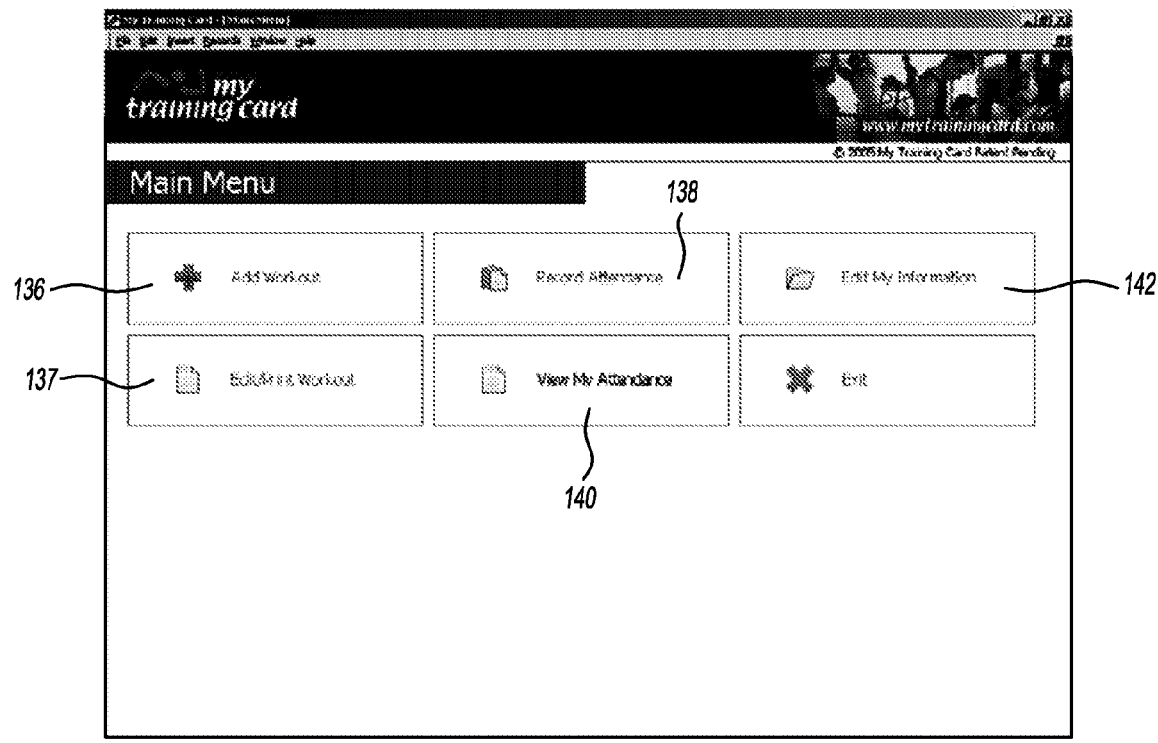
FIG. 11 is a user folder for the exercise facility system accessed from the rigid card.
Figure 12:
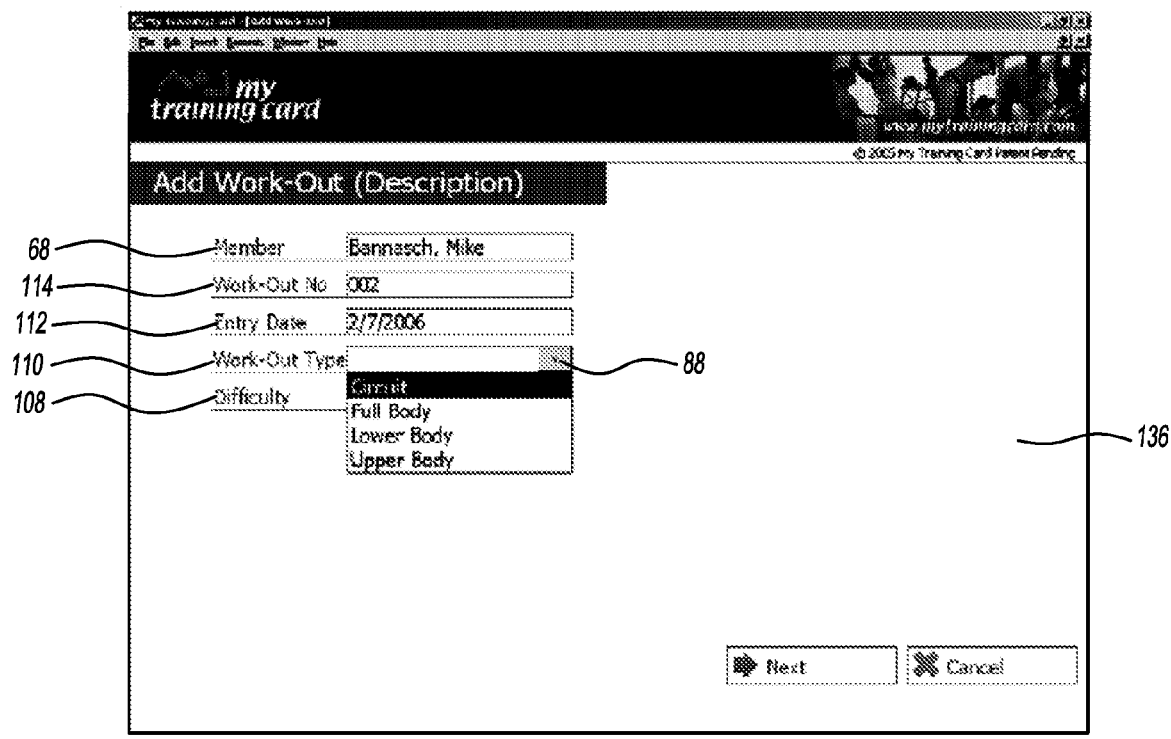
FIG. 12 is a new workout option for the exercise facility system.
Figure 13:
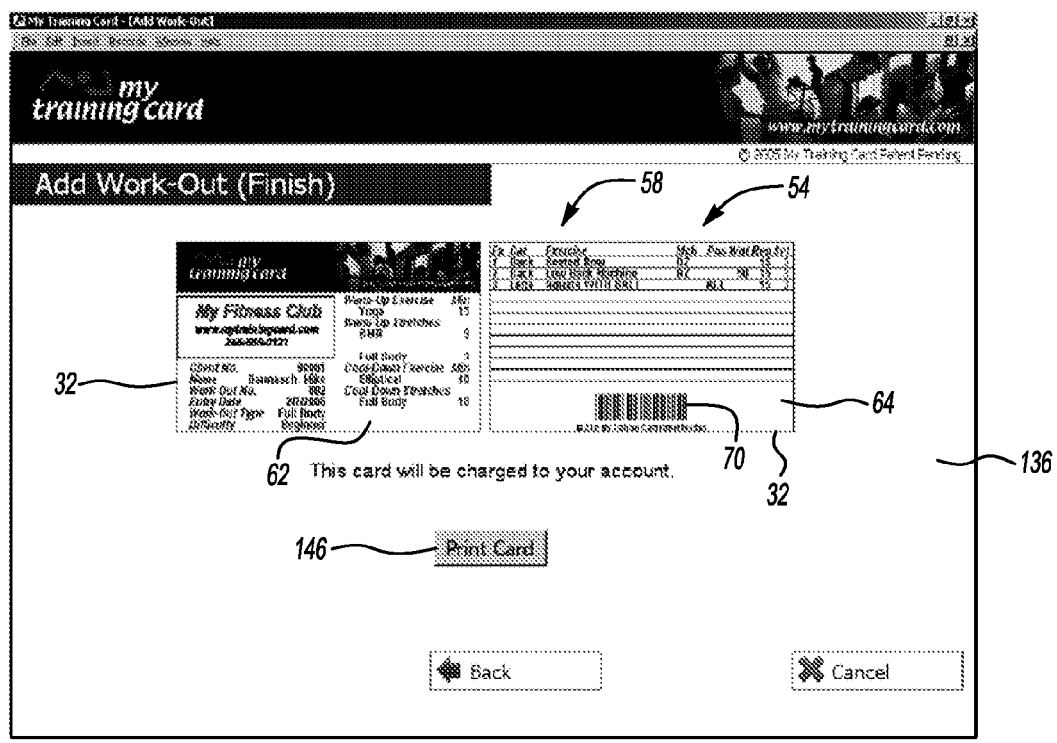
FIG. 13 is the exercise facility system displaying the rigid card ready for printing.
Figure 14:
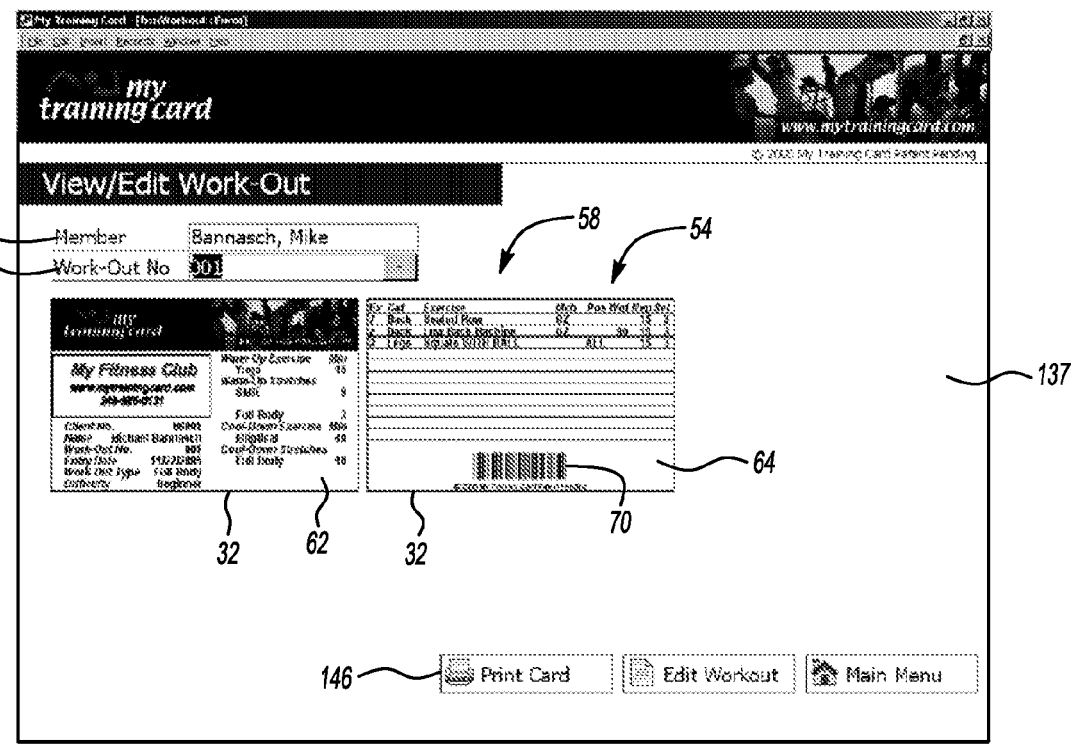
FIG. 14 is an edit/print workout option for the exercise facility system.
Figure 15:
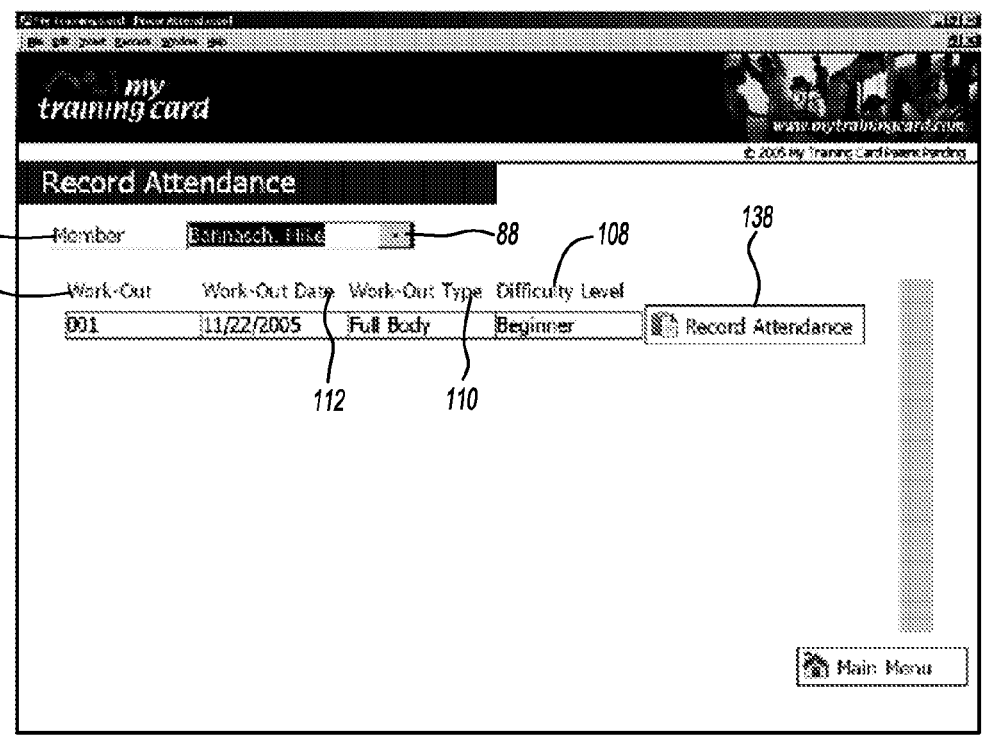
FIG. 15 is a log attendance option for the exercise facility system.
Figure 16:
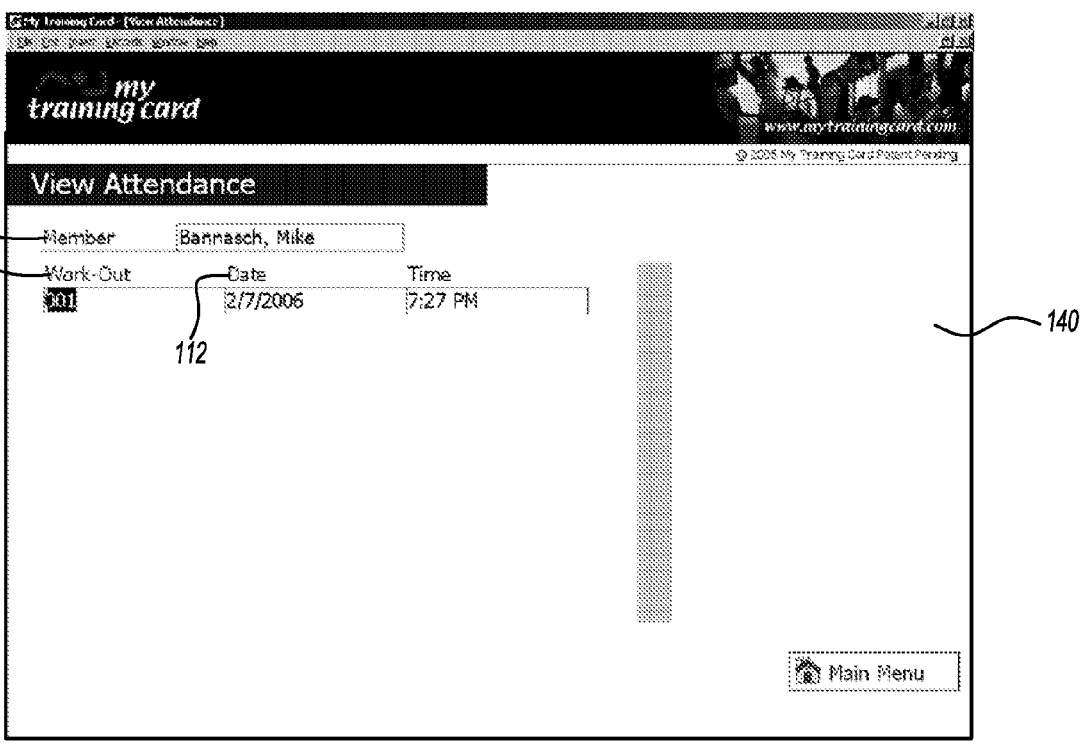
FIG. 16 is a view attendance option for the exercise facility system.

As shown in FIG. 11, the user folder 126 of the user 26 includes a new workout option 136, an edit/print workout option 137, a log attendance option 138, a view attendance log option 140, and an edit user information option 142. Also referring to FIGS. 12 and 13, the new workout option 136 allows the user 26 to create and print the exercise routine 58 to perform. Also referring to FIG. 14, the edit/print workout option 137 allows the user 26 to add and/or delete at least one of the exercises 54 of the exercise routine 58 to create an alternative exercise routine 144 which is input into the computer 34 and received in the database 40 (as shown in FIG. 1). The alternative exercise routine 144 provides the user 26 with a choice between performing the exercise routine 58 printed on the rigid card 32 and performing the alternative exercise routine 144 printed on the second rigid card 116. The new workout option 136 and the edit/print workout option 137 each include a print button 146 to print the exercise routine 58 on the rigid card 32 and print the alternative exercise routine 144 on the second rigid card 116. Referring to FIG. 15, the log attendance option 138 allows the user 26 to record when he/she visits the exercise facility and may indicate which workout was performed on the previous session. This allows the user to decide which work out to perform at the current session. As shown in FIG. 16, the view attendance log option 140 allows the user 26 to view the frequency he/she attends the exercise facility. Referring to FIGS. 10 and 11, the edit user information option 142 allows the user 26 to add and/or delete user information 128 to define updated user information 148 (as shown in FIG. 1).

Referring to FIGS. 4A and 4B, the administrator 22 has access to all of the user folders 126 in the database 40 when utilizing the maintenance card 28. The maintenance card 28 has a front side 150 and a back side 152 opposing one another. The front side 150 of the maintenance card 28 has a title 154 to identify the card as the maintenance card 28. However, it is to be appreciated that the title 154 may be disposed on the back side 152 of the maintenance card 28. The back side 152 of the maintenance card 28 has a machine readable code 156 that the kiosk 38 reads for accessing a plurality of administrative information, generally shown at 158, stored in the database 40 (as shown in FIG. 17).

Figure 17:
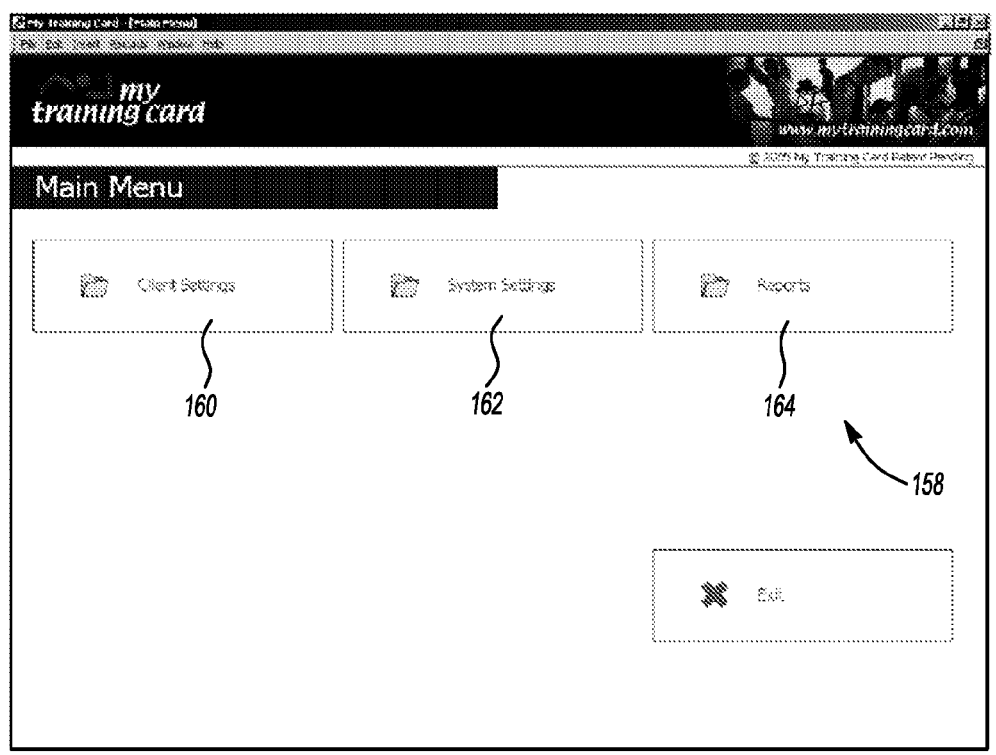
FIG. 17 is an all user folder, a systems folder, and a reports folder for the exercise facility system accessed from the maintenance card.
Figure 18:
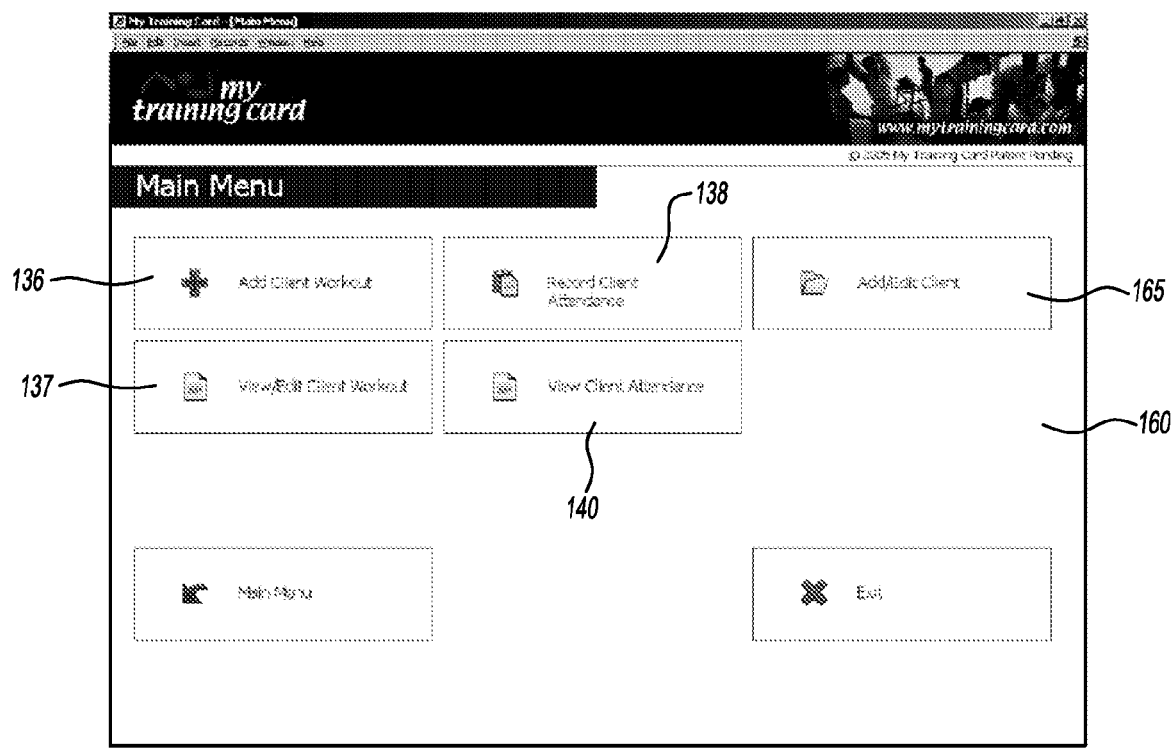
FIG. 18 is the all user folder for the exercise facility system accessed from the maintenance card.
Figure 19:
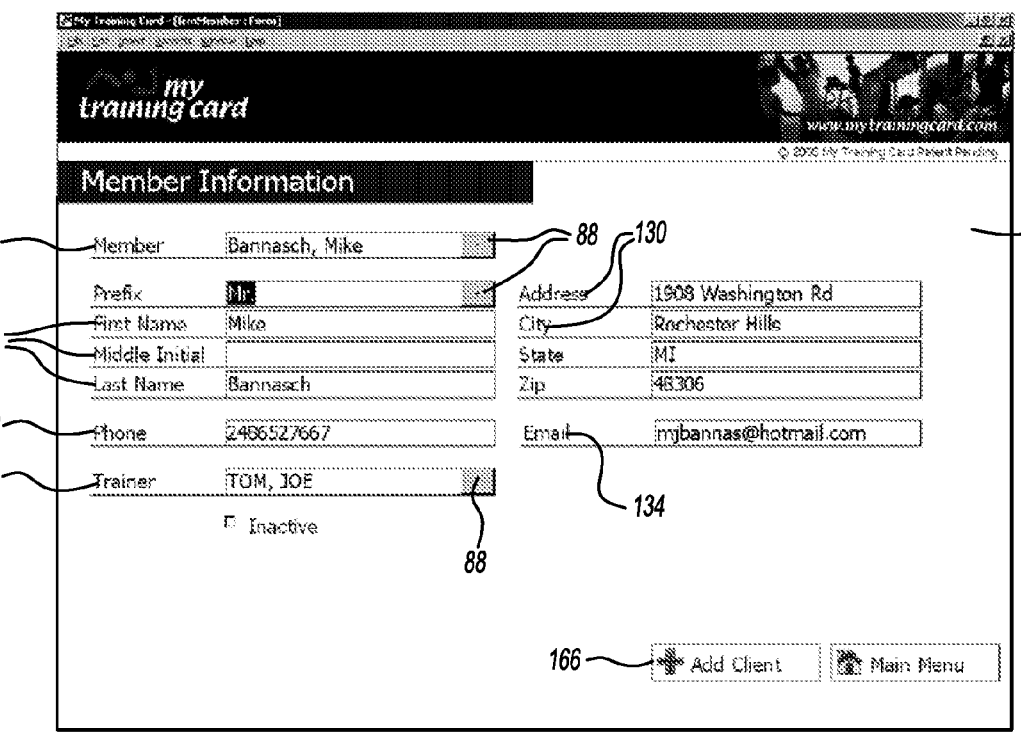
FIG. 19 is the user information for the exercise facility system accessed from the maintenance card.

As best shown in FIG. 17, the administrative information 158 includes an all user folder 160, a systems folder 162, and a reports folder 164. The all user folder 160 includes information relating to every user 26 of the exercise facility. Referring to FIG. 18, the all user folder 160 includes the new workout option 136, the edit/print workout option 137, the log attendance option 138, the view attendance log option 140, and an add/edit user option 165. Also referring to FIGS. 12 and 13, the new workout option 136 allows the administrator 22 to create and print the exercise routine 58 for the user 26 to perform. Also referring to FIG. 14, the edit/print workout option 137 allows the administrator 22 to add and/or delete at least one of the exercises 54 of the exercise routine 58 to create the alternative exercise routine 144 which is input into the computer 34 and received in the database 40 (as shown in FIG. 1). The new workout option 136 and the edit/print workout option 137 each include the print button 146 to print the exercise routine 58 on the rigid card 32 and print the alternative exercise routine 144 on the second rigid card 116. As shown in FIG. 15, the log attendance option 138 allows the administrator 22 to record when the user 26 visits the exercise facility. Referring to FIG. 16, the view attendance log option 140 allows the administrator 22 to view the frequency the user 26 attends the exercise facility and the workout routines that have been previously completed. As shown in FIGS. 18 and 19, the add/edit user option 165 allows the administrator 22 to add and/or delete the user information 128 specific to each of the users 26 to define the updated user information 148 (as shown in FIG. 1). The add/edit user option 165 also includes an additional user option 166 to add another user to the database 40.

Figure 20:
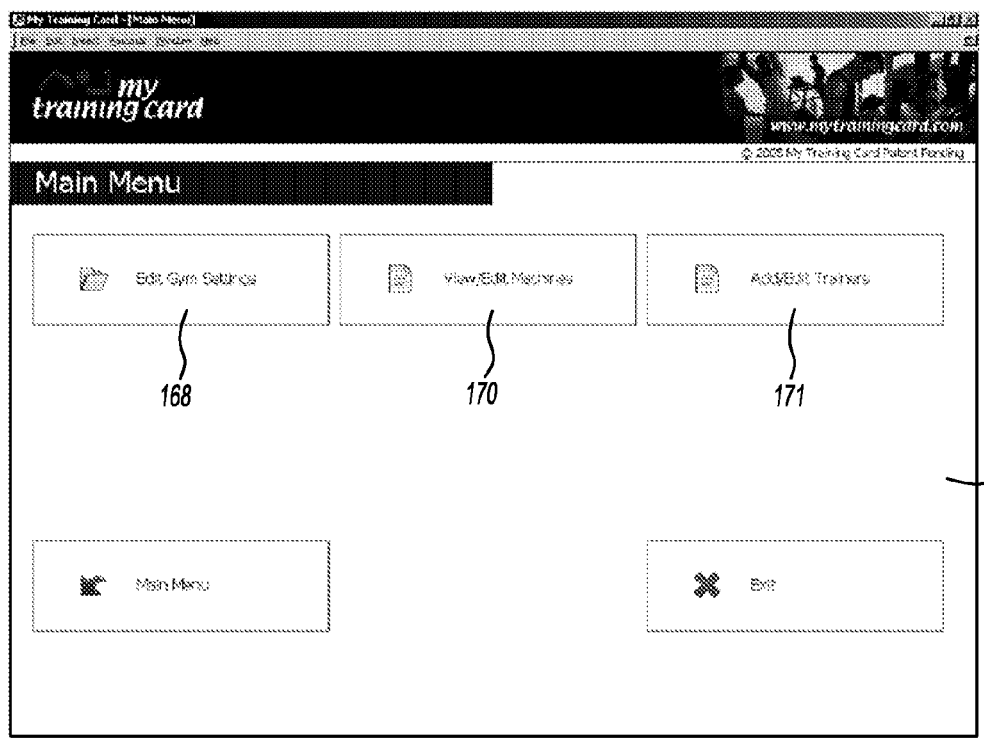
FIG. 20 is the systems folder for the exercise facility system accessed from the maintenance card.
Figures 21, 22:
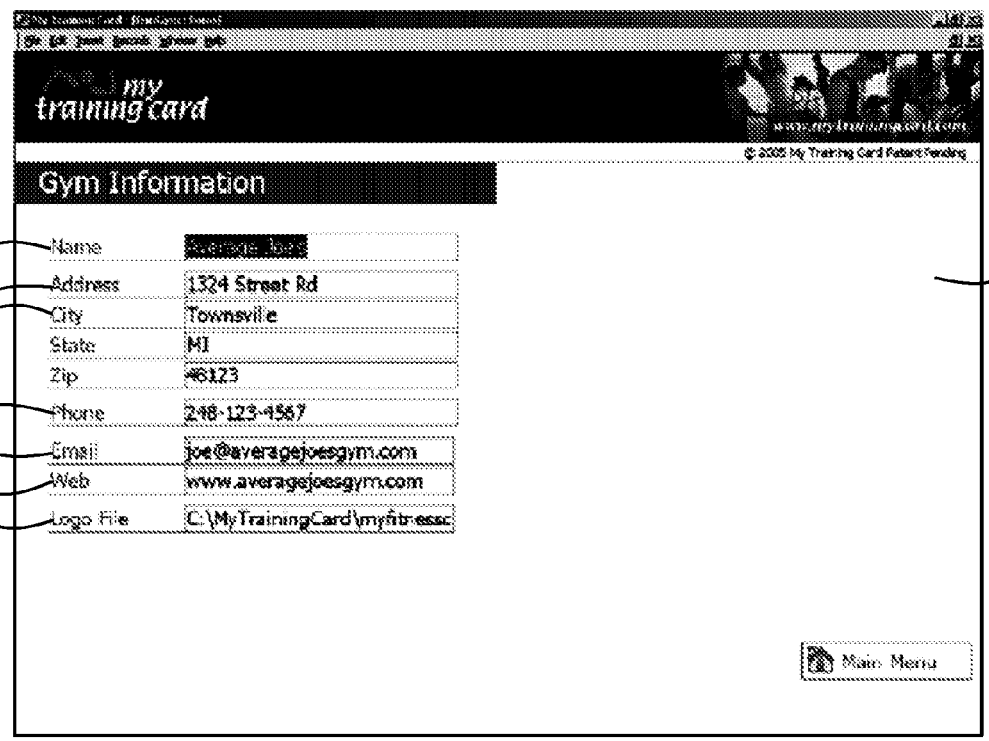
FIG. 21 is an edit facility information option for the exercise facility system accessed from the maintenance card.
FIG. 22 is an edit machines option and corresponding abbreviations for the exercise facility system.
Figure 23:
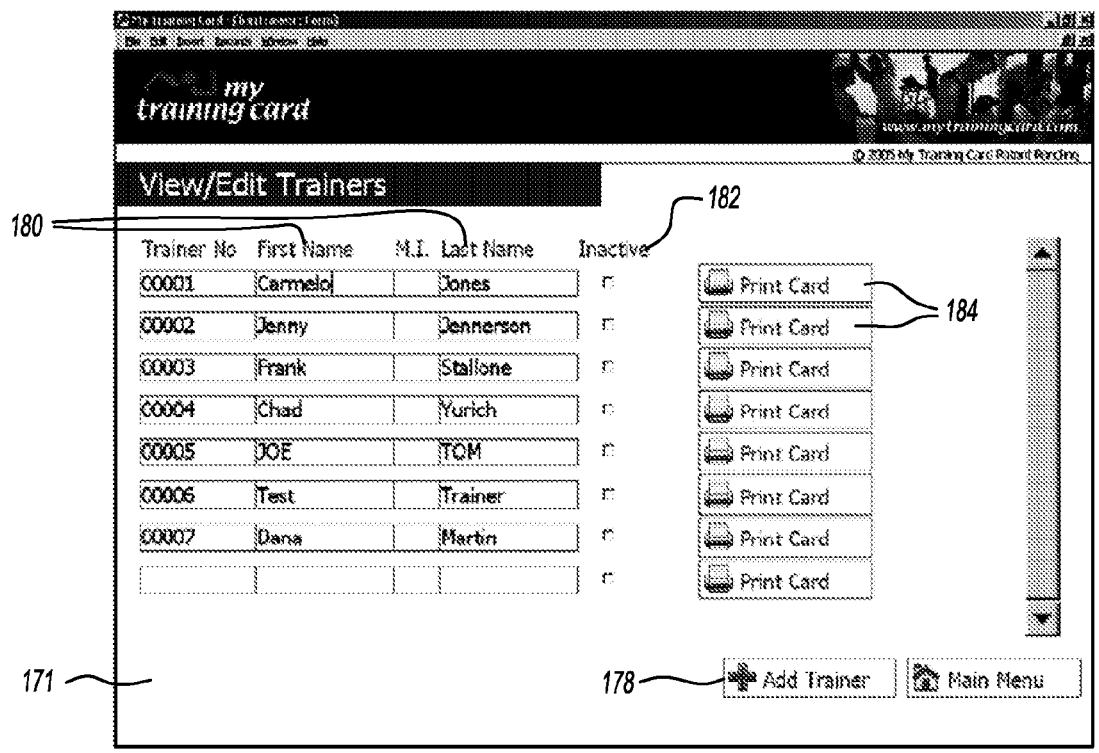
FIG. 23 is an add/edit trainer option for the exercise facility system accessed from the maintenance card.

Referring to FIG. 20, the systems folder 162 includes an edit facility information option 168, an edit machines option 170, and an add/edit trainers option 171. As shown in FIG. 21, the administrator 22 uses the edit facility information option 168 to change the personal information of the exercise facility that includes a company address 172, a company email address 174, a company logo file 176, the company name 120, the company phone number 122, and the company website 124. As shown in FIG. 22, the edit machines option 170 allows the administrator 22 to add and/or delete the exercise machines 104 available for the users 26 to operate at the exercise facility. As shown in FIG. 23, the add/edit trainers option 171 allows the administrator 22 to add an additional trainer 178, edit a trainer name 180, edit a number of trainers 182 currently available to assist the users 26, and a print option 184 to print the trainer card 30.

Figure 24:
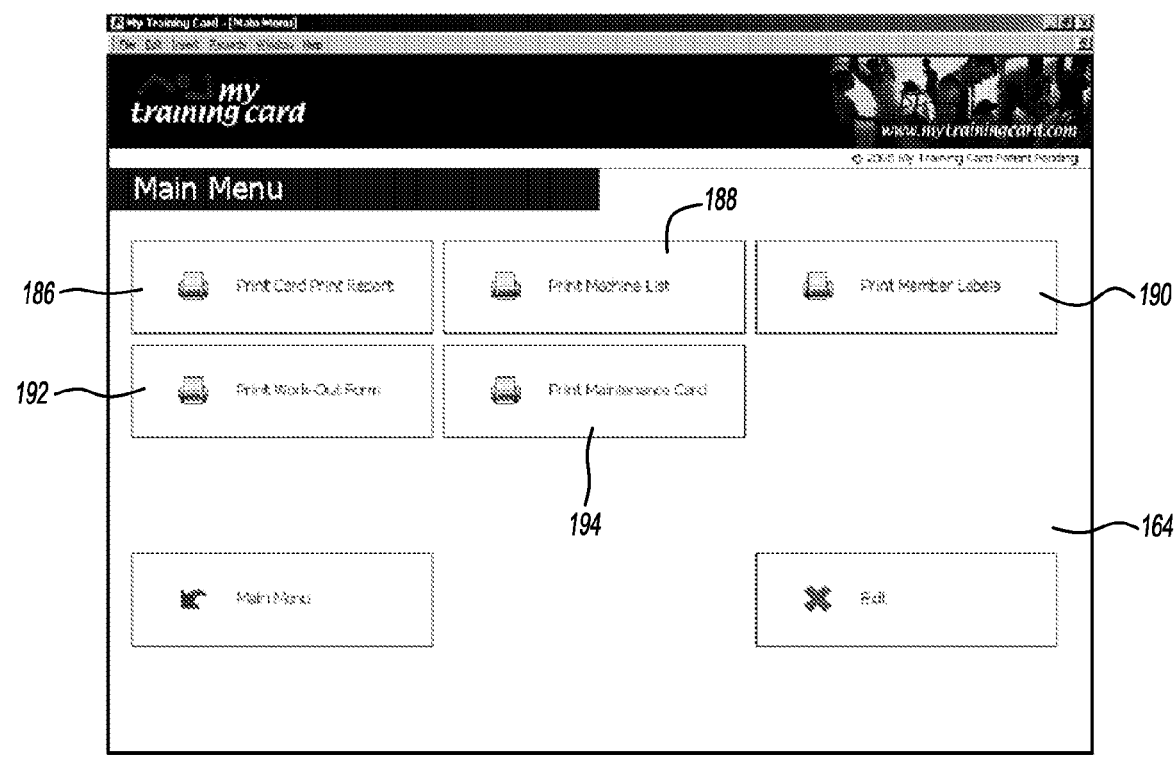
FIG. 24 is the reports folder for the exercise facility system accessed from the maintenance card.
Figure 25:
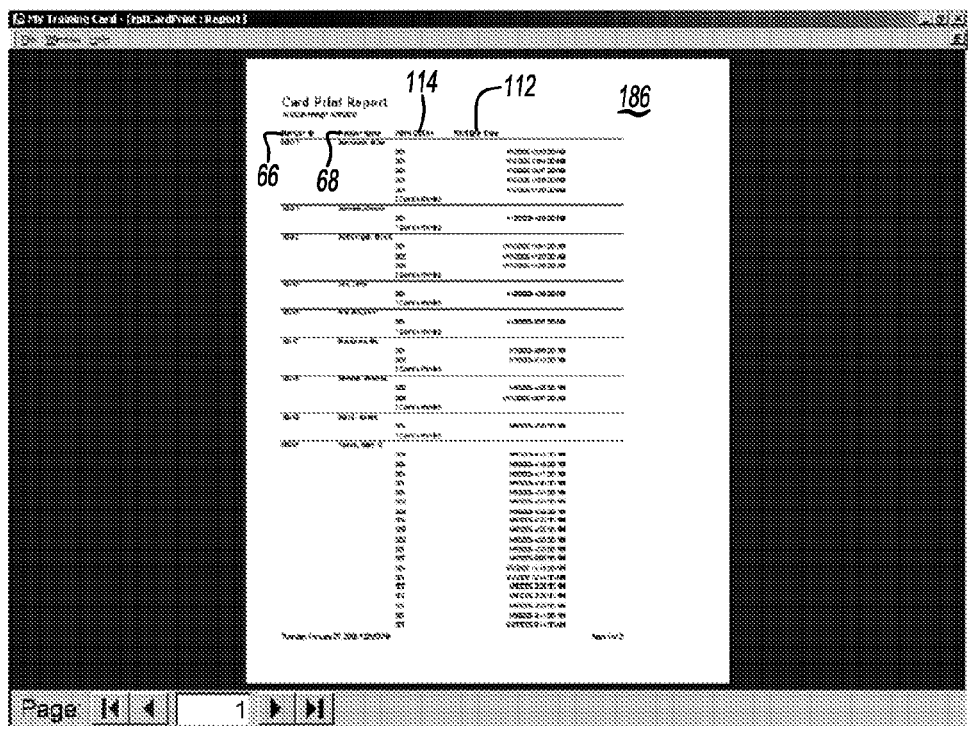
FIG. 25 is an illustration of the computer terminal showing a screen-shot of a report option which displays the rigid cards generated over a specified time period for the exercise facility system accessed from the maintenance card.
Figure 27:
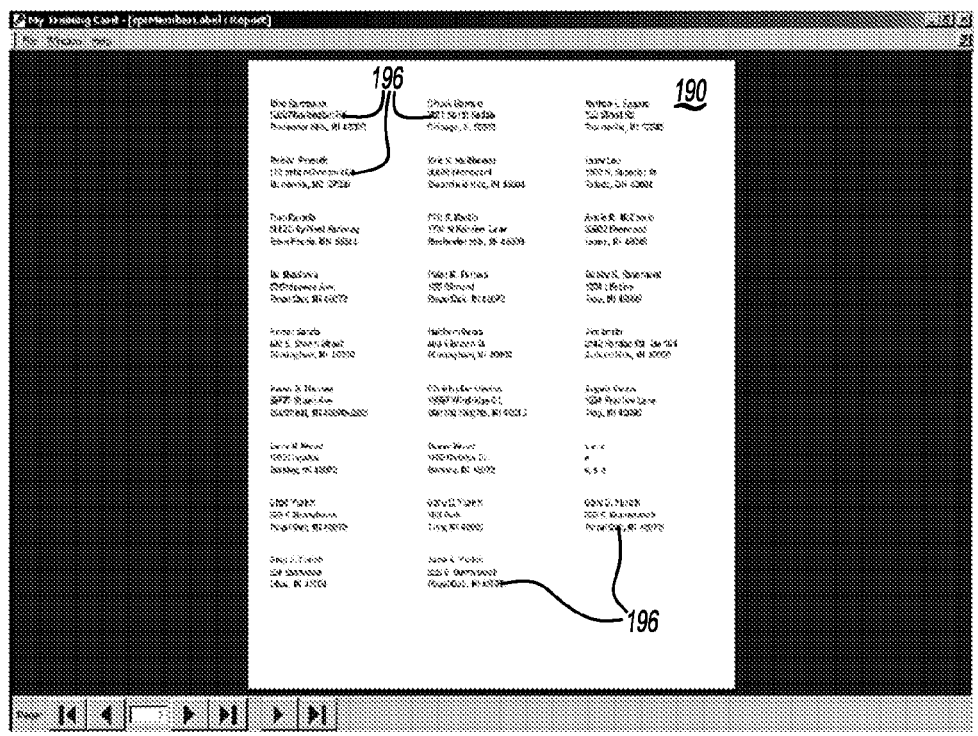
FIG. 27 is an illustration of the computer terminal showing a screen-shot of a printable user label option for the exercise facility system.

Referring to FIG. 24, the reports folder 164 includes a report option 186, a machine list option 188, a user label option 190, a generic workout form sheet option 192, and an additional maintenance card option 194. As shown in FIG. 25, the report option 186 allows the administrator 22 to print a list of all of the users 26 of the exercise facility and the number of cards (the rigid card 32, the second rigid card 116, the third rigid card, etc.) issued to each user 26 over a specified time period. As shown in FIG. 26, the machine list option 188 allows the administrator 22 to print all of the available exercise machines 104. As shown in FIG. 27, the user label option 190 allows the administrator 22 to print an address label 196 of each of the users 26. Referring back to FIG. 6, the generic workout form sheet option 192 allows the administrator 22 to print the workout form sheet 56 for the users 26 to utilize anytime he/she visits the exercise facility. The workout form sheet 56 provides a way for the exercises 54 to be hand written on the sheet 56 and later received in the database 40 and printed on the rigid card 32. The additional maintenance card option 194 allows the administrator 22 to print another maintenance card 28 (as shown in FIG. 24).

Referring back to FIGS. 5A and 5B, the trainer 24 has limited access to the user folders 126 in the database 40 when utilizing the trainer card 30. The trainer 24 only has access to the exercise routines 58 of the users 26 he assists at the exercise facility. The trainer card 30 has a front side 198 and a back side 200 opposing one another. The front side 198 of the trainer card 30 has a title 202 to identify the card as the trainer card 30 and the trainer name 180 to identify who owns the trainer card 30. It is contemplated that the title 202 may be disposed on the back side 200 of the trainer card 30. A machine readable code 204 is disposed on the back side 200 of the trainer card 30 for accessing a plurality of trainer information, generally shown at 206, stored in the database 40 on the computer 34 (as shown in FIG. 28).

Figure 28:
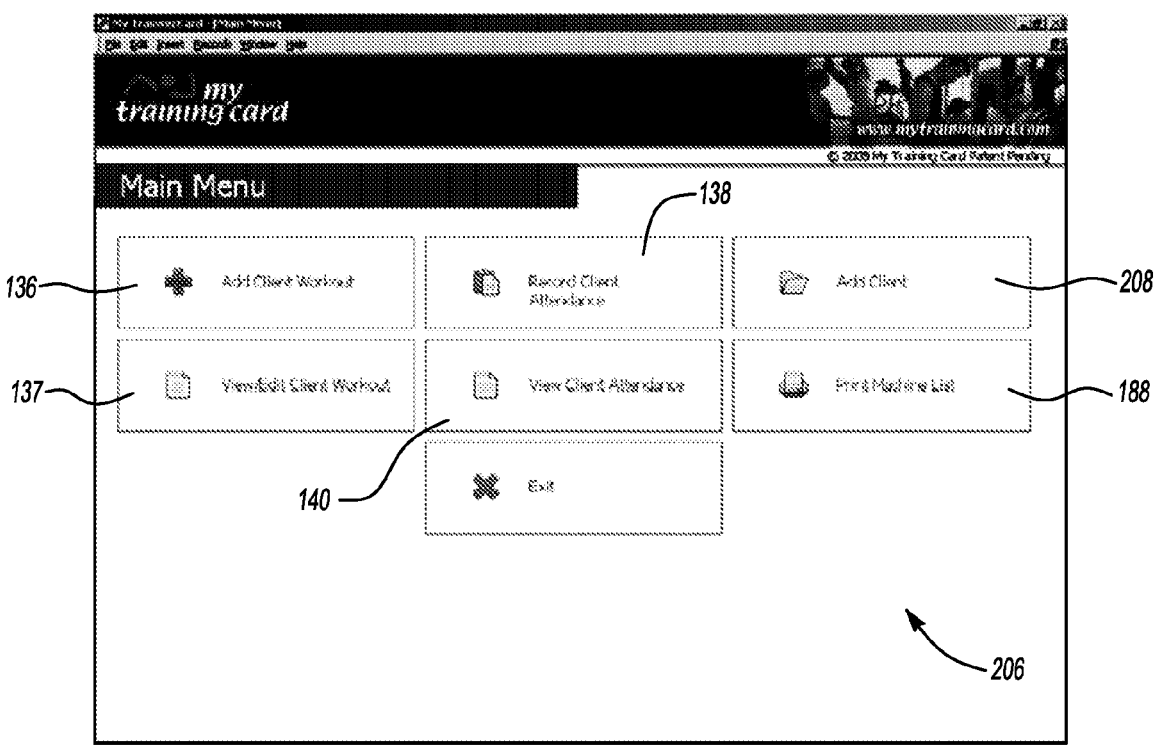
FIG. 28 is a plurality of trainer information for the exercise facility system accessed from the trainer card.

As best shown in FIG. 28, the trainer information 206 includes the new workout option 136, the edit/print workout option 137, the log attendance option 138, the view attendance log option 140, an add user option 208, and the machine list option 188. Also referring to FIGS. 12 and 13, the new workout option 136 allows the trainer 24 to create and print the exercise routine 58 for the user 26 to perform. Also referring to FIG. 14, the edit/print workout option 137 allows the trainer 24 to add and/or delete at least one of the exercises 54 of the exercise routine 58 to create the alternative exercise routine 144 which is input into the computer 34 and received in the database 40 (as shown in FIG. 1). The new workout option 136 and the edit/print workout option 137 each include the print button 146 to print the exercise routine 58 on the rigid card 32 and print the alternative exercise routine 144 on the second rigid card 116. As shown in FIG. 15, the log attendance option 138 allows the trainer 24 to record when the user 26 visits the exercise facility. Referring to FIG. 16, the view attendance log option 140 allows the trainer 24 to view the frequency the user 26 attends the exercise facility. The add user option 208 allows the trainer 24 to add a new user to his/her list of current users 26. As shown in FIG. 26, the machine list option 188 allows the trainer 24 to print all of the available exercise machines 104.

The present invention provides a method of creating rigid cards 32 for use by the user 26 having the exercise routine 58 thereon from the computer 34 in communication with the database 40. The method includes determining the plurality of exercises 54 specific to the user 26 to perform at the exercise facility. More specifically, the exercises 54 are defined as the warm-up phase 72, the cool-down phase 74, and the exertion phase 76. The warm-up phase 72 is further defined as the warm-up exercise 78 and the warm-up stretch 80. The cool-down phase 74 is further defined as the cool-down exercise 82 and the cool-down stretch 84. The exertion phase 76 is further defined as the targeted muscle group 100, the type of exercise 102, and the exercise machine 104. The exercises 54 are input into the computer 34 and received in the database 40 to define the exercise routine 58 specific to the user 26. More specifically, the warm-up phase 72, the cool-down phase 74, and the exertion phase 76 are input into the computer 34.

The unique identifier 60 specific to the user 26 is assigned to identify the user 26 in the database 40. The unique identifier 60 is input into the computer 34 and linked to the exercise routine 58. The unique identifier 60 is further defined as the user number 66, the user name 68, and the machine readable code 70. The unique identifier 60 and the exercise routine 58 are stored in the database 40 and printed on the rigid card 32. More particular, the warm-up phase 72 and the cool-down phase 74 are printed on the front side 62 of the rigid card 32 and the exertion phase 76 is printed on the back side 64 of the rigid card 32. In addition, the user number 66 and the user name 68 are printed on the front side 62 of the rigid card 32 and the machine readable code 70 is printed on the back side 64 of the rigid card 32.

The method further includes modifying the exercise routine 58 specific to the user 26 by adding and/or deleting at least one of the exercises 54. The added and/or deleted exercises 54 are input into the computer 34 and received in the database 40 to define the alternative exercise routine 144. The alternative exercise routine 144 is linked to the unique identifier 60 and stored in the database 40. The unique identifier 60 and the alternative exercise routine 144 are printed on the second rigid card 116. The user 26 then chooses between performing the exercise routine 58 printed on the rigid card 32 and performing the alternative exercise routine 144 printed on the second rigid card 116.

In addition to the exercise routine 58, the user information 128 specific to the user 26 is input into the computer 34. The user information 128 is linked to the unique identifier 60 and the exercise routine 58. The user information 128 is stored in the database 40 to define the user folder 126. The rigid card 32 is utilized to access the user folder 126 on the computer 34. More specifically, the rigid card 32 is utilized to access the user information 128 and the exercise routine 58 in the user folder 126. The method further includes modifying the user information 128 in the user folder 126 by adding and/or deleting the user information 128 to define updated user information 148 which is stored in the user folder 126.

The method further includes utilizing the user terminal 36 to access the exercise routine 58 specific to the user 26. The rigid card 32 is inserted into the user terminal 36 to access and/or modify the exercise routine 58 specific to the user 26. In addition, the exercise routine 58 may be modified by accessing the user terminal 36 through the remote device 42 coupled to the network connection 44.

Many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method of creating rigid cards (32) formed of a plastic material for use by a user (26) having an exercise routine (58) thereon generated from a computer (34) in communication with a database (40), said method comprising the steps of;

determining a plurality of exercises (54) specific to the user (26), inputting the exercises (54) into the computer (34) to define the exercise routine (58) specific to the user (26), inputting at least one unique identifier (60) to identify the user (26) into the computer (34), linking the unique identifier (60) to the exercise routine (58), storing the unique identifier (60) and the exercise routine (58) in the database (40), printing the unique identifier (60) and the exercise routine (58) on the rigid card (32), modifying the exercise routine (58) specific to the user (26), inputting the modified exercise routine into the computer (34) to define an alternative exercise routine (144), linking the alternative exercise routine (144) to the unique identifier (60), storing the alternative exercise routine (144) in the database (40), and printing the unique identifier (60) and the alternative exercise routine (144) on a second rigid card (116).

2. A method as set forth in claim 1, further including the step of choosing between the exercise routine (58) printed on the rigid card (32) and the alternative exercise routine (144) printed on the second rigid card (116) for the user (26) to perform.

3. A method as set forth in claim 1, wherein the step of determining the plurality of exercises (54) is further defined as determining at least one of a warm-up phase (72), a cool-down phase (74), and an exertion phase (76).

4. A method as set forth in claim 3, wherein the step of determining the warm-up phase (72) is further defined as determining at least one of a warm-up exercise (78) and a warm-up stretch (80).

5. A method as set forth in claim 3, wherein the step of determining the cool-down phase (74) is further defined as determining at least one of a cool-down exercise (82) and a cool-down stretch (84).

6. A method as set forth in claim 3, wherein the step of determining the exertion phase (76) is further defined as determining at least one of a targeted muscle group (100), a type of exercise (102), and an exercise machine (104).

7. A method as set forth in claim 3, wherein the step of inputting the exercises (54) is further defined as inputting the warm-up phase (72), the cool-down phase (74), and the exertion phase (76) into the computer (34).

8. A method as set forth in claim 7, wherein the step of printing the exercises (54) is further defined as printing the warm-up phase (72), the cool-down phase (74), and the exertion phase (76) on the rigid card (32).

9. A method as set forth in claim 8, wherein the step of printing the warm-up phase (72) and the cool-down phase (74) is further defined as printing the warm-up phase (72) and the cool-down phase (74) on a front side (62) of the rigid card (32).

10. A method as set forth in claim 8, wherein the step of printing the exertion phase (76) is further defined as printing the exertion phase (76) on a back side (64) of the rigid card (32).

11. A method as set forth in claim 1, wherein the step of modifying the exercise routine (58) specific to the user (26) is further defined as at least one of adding and deleting at least one of the exercises (54) of the exercise routine (58).

12. A method as set forth in claim 11, wherein the step of inputting the modified exercise routine (58) is further defined as inputting the at least one of added and deleted exercises (54) into the computer (34) to define the alternative exercise routine (144).

13. A method as set forth in claim 1, wherein the step of printing the unique identifier (60) on the rigid card (32) is further defined as printing a user number (66) on a front side (62) of the rigid card (32).

14. A method as set forth in claim 1, wherein the step of printing the unique identifier (60) on the rigid card (32) is further defined as printing a user name (68) on a front side (62) of the rigid card (32).

15. A method as set forth in claim 1, wherein the step of printing the unique identifier (60) on the rigid card (32) is further defined as printing a machine readable code (70) on a back side (64) of the rigid card (32).

16. A method as set forth in claim 1, further including the step of inputting a plurality of user information (128) specific to the user (26) into the computer (34).

17. A method as set forth in claim 16, further including the step of linking the user information (128) to the unique identifier (60) and the exercise routine (58).

18. A method as set forth in claim 17, further including the step of storing the user information (128) in the database (40) to define a user folder (126) specific to the user (26).

19. A method as set forth in claim 18, further including the step of utilizing the rigid card (32) to access the user folder (126) on the computer (34).

20. A method as set forth in claim 19, wherein the step of utilizing the rigid card (32) to access the user folder (126) is further defined as utilizing the rigid card (32) to access the user information (128) and the exercise routine (58) in the user folder (126).

21. A method as set forth in claim 20, further including the step of modifying the user information (128) in the user folder (126).

22. A method as set forth in claim 21, wherein the step of modifying the user information (128) in the user folder (126) is further defined as at least one of adding and deleting the user information (128) to define updated user information (148).

23. A method as set forth in claim 22, further including the step of storing the updated user information (148) in the user folder (126).

24. A method as set forth in claim 1, further including the step of utilizing a user terminal (36) to access the exercise routine (58) specific to the user (26).

25. A method as set forth in claim 24, further including the step of inserting the rigid card (32) into the user terminal (36) to access the exercise routine (58) specific to the user (26).

26. A method as set forth in claim 25, further including the step of modifying the exercise routine (58) at the user terminal (36).

27. A method as set forth in claim 26, wherein the step of modifying the exercise routine (58) at the user terminal (36) is further defined as modifying the exercise routine (58) through a remote device (42) coupled to a network connection (44).

28. A method as set forth in claim 1, wherein the rigid card (32) has a width of at most 5 inches and a height of at most 7 inches.

29. A method of creating rigid cards (32) formed of a plastic material for use by a user (26) having an exercise routine (58) thereon generated from a database (40), said method comprising the steps of;

determining a plurality of exercises (54) specific to the user (26), receiving the exercises (54) in the database (40) to define the exercise routine (58) specific to the user (26), assigning at least one unique identifier (60) to identify the user (26) in the database (40), linking the unique identifier (60) to the exercise routine (58) in the database (40), printing the unique identifier (60) and the exercise routine (58) on the rigid card (32), modifying the exercise routine (58) specific to the user (26), receiving the modified exercise routine in the database (40) to define an alternative exercise routine (144), linking the alternative exercise routine (144) to the unique identifier (60) in the database (40), and printing the unique identifier (60) and the alternative exercise routine (144) on a second rigid card (116).

30. A method as set forth in claim 29, wherein the rigid card (32) has a width of at most 5 inches and a height of at most 7 inches.

* * * * *

UNITED STATES PATENT AND TRADEMARK OFFICE
CERTIFICATE OF CORRECTION

PATENT NO. : 7,648,442 B2
APPLICATION NO. : 11/277837
DATED : January 19, 2010
INVENTOR(S) : Yurich et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this

Twenty-third Day of November, 2010

David J. Kappos
*Director of the United States Patent and Trademark Office*